(12) United States Patent
Wang et al.

(10) Patent No.: US 10,043,505 B2
(45) Date of Patent: Aug. 7, 2018

(54) WIRELESS DEVICE AND METHOD IN THE WIRELESS DEVICE

(71) Applicant: Beken Corporation, Shanghai (CN)

(72) Inventors: Weifeng Wang, Shanghai (CN); Yiming Huang, Shanghai (CN)

(73) Assignee: BEKEN CORPORATION, Shanghai (CN)

( * ) Notice: Subject to any disclaimer, the term of this patent is extended or adjusted under 35 U.S.C. 154(b) by 450 days.

(21) Appl. No.: 14/746,851

(22) Filed: Jun. 23, 2015

(65) Prior Publication Data

US 2016/0358613 A1 Dec. 8, 2016

(30) Foreign Application Priority Data

Jun. 3, 2015 (CN) .......................... 2015 1 0300190

(51) Int. Cl.
*G10H 1/36* (2006.01)
*G10L 19/16* (2013.01)
*G10L 21/055* (2013.01)

(52) U.S. Cl.
CPC ............. *G10H 1/366* (2013.01); *G10H 1/361* (2013.01); *G10H 2240/211* (2013.01); *G10H 2250/595* (2013.01); *G10L 19/167* (2013.01)

(58) Field of Classification Search
None
See application file for complete search history.

(56) References Cited

U.S. PATENT DOCUMENTS

| 6,578,162 B1* | 6/2003 | Yung | G10L 19/02 375/244 |
| 2005/0078683 A1* | 4/2005 | Page | G10H 1/0058 370/395.5 |
| 2006/0074642 A1* | 4/2006 | You | G10L 19/025 704/222 |

* cited by examiner

*Primary Examiner* — Richa Mishra
(74) *Attorney, Agent, or Firm* — Perkins Coie LLP

(57) ABSTRACT

A transmitter comprises an analog-to-digital converter, an audio signal compressor, a framer, a scrambler, a modulator, and a transmitting unit. The analog-to-digital converter translates an analog audio signal into a digital Pulse-Code Modulation (PCM) format audio signal. The audio signal compressor compresses the PCM format audio signal into a coded bit stream with a modified Adaptive differential Pulse-code Modulation (ADPCM) algorithm. The framer packetizes the coded bit stream into a 1.125 ms frame data by adding a preamble, a signaling field, a data field, and a cyclic redundancy check field to the coded bit stream. The scrambler scrambles the frame data with an ID number. The modulator generates a modulated signal by modulating the scrambled frame data with a predetermined modulation scheme. The transmitting unit transmits the modulated signal.

18 Claims, 5 Drawing Sheets

Frame Processing

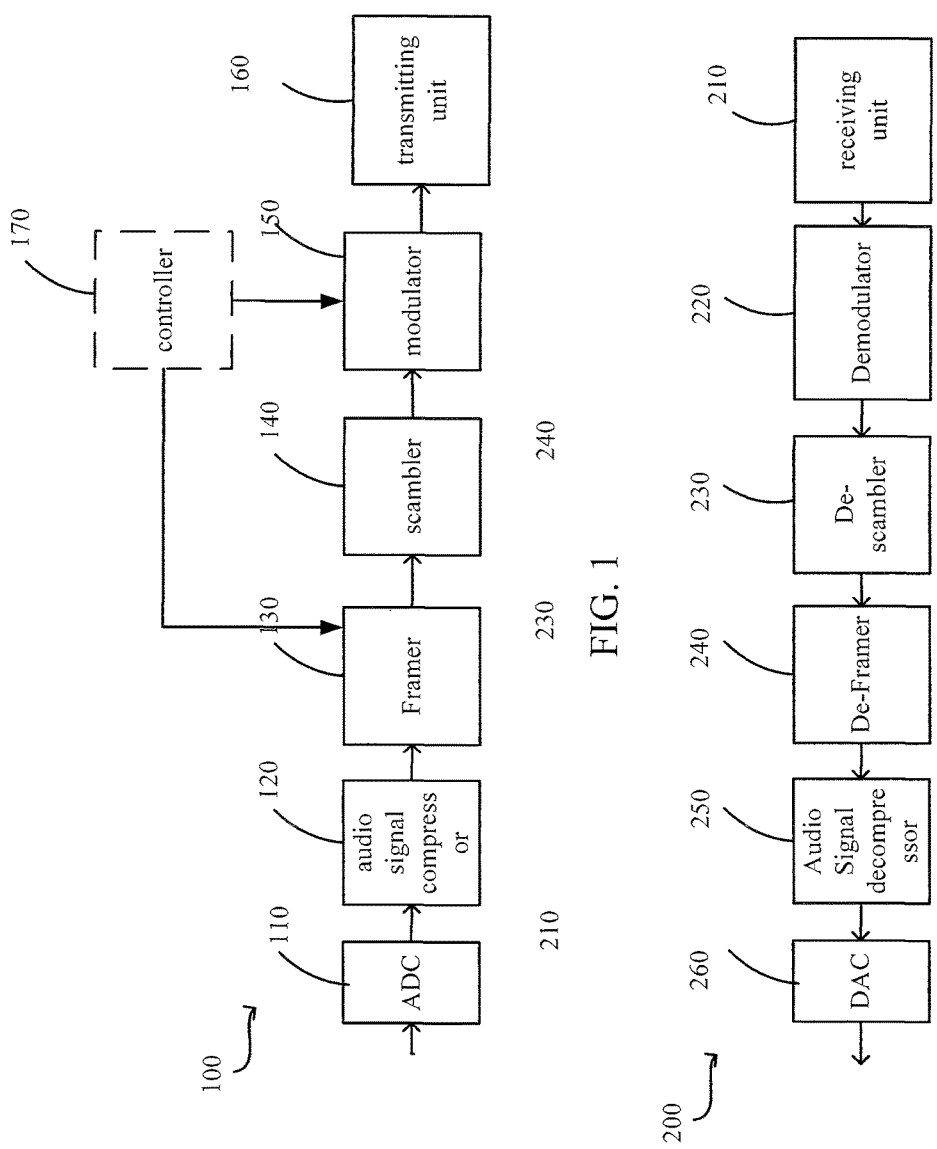

Frame Structure

Frame Processing

WIRELESS DEVICE AND METHOD IN THE WIRELESS DEVICE

CROSS REFERENCE TO RELATED APPLICATION

This application claims priority to Chinese Application No. 201510300190.3 entitled "wireless device and method in the wireless device," filed on Jun. 3, 2015 by Beken Corporation, which is incorporated herein by reference.

TECHNICAL FIELD

The present application relates to a wireless device and a method in the wireless device, and more particularly but not exclusively to a wireless device to implement digital audio transmission with ultra-low latency.

BACKGROUND

Conventional products commonly found in the marketplace use general purpose 2.4 GHz Gaussian Frequency Shift Key (GFSK) transceiver to transfer compressed audio data. However, the conventional products have wide occupied bandwidth, which is unsuitable for multi-user application. Further, the latency of conventional product is a few tens of millisecond that is not suitable for video display with wireless audio, such as a wireless microphone in a karaoke application.

SUMMARY

In an embodiment of the invention, a transmitter comprises an analog-to-digital converter, an audio signal compressor, a framer, a scrambler, a modulator, and a transmitting unit. The analog-to-digital converter translates an analog audio signal into a digital Pulse-Code Modulation (PCM) format audio signal. The audio signal compressor compresses the PCM format audio signal into a coded bit stream with a modified Adaptive differential Pulse-code Modulation (ADPCM) algorithm. The framer packetizes the coded bit stream into a 1.125 ms frame data by adding a preamble, a signaling field, a data field, and a cyclic redundancy check field to the coded bit stream. The scrambler scrambles the frame data with an ID number. The ID number is an identifier of the transmitter. Different transmitter has a unique ID number. The modulator generates a modulated signal by modulating the scrambled frame data with a predetermined modulation scheme. The transmitting unit transmits the modulated signal.

In another embodiment of the invention, A receiver comprises a receiving unit, a demodulator, a de-scrambler, a de-framer, an audio signal decompressor and a digital-to-analog converter. The receiving unit receives a signal. The demodulator generates a demodulated signal by demodulating the signal with a predetermined demodulation scheme. The de-scrambler de-scrambles the demodulated signal with an ID number. The de-framer de-packetizes the de-scrambled signal into coded bit stream by removing a preamble, a signaling field, a data field, and a cyclic redundancy check field from the de-scrambled signal. The audio signal decompressor decompresses the coded bit stream into a PCM format audio signal using a modified Adaptive differential Pulse-code Modulation (ADPCM) algorithm. The digital-to-analog converter translates the PCM format audio signal into analog audio signal.

DESCRIPTION OF DRAWINGS

Non-limiting and non-exhaustive embodiments of the present invention are described with reference to the following figures, wherein like reference numerals refer to like parts throughout the various views unless otherwise specified.

FIG. 1 is a block diagram illustrating an embodiment of a transmitter.

FIG. 2 is a block diagram illustrating an embodiment of a receiver.

DETAILED DESCRIPTION

Figure 3:
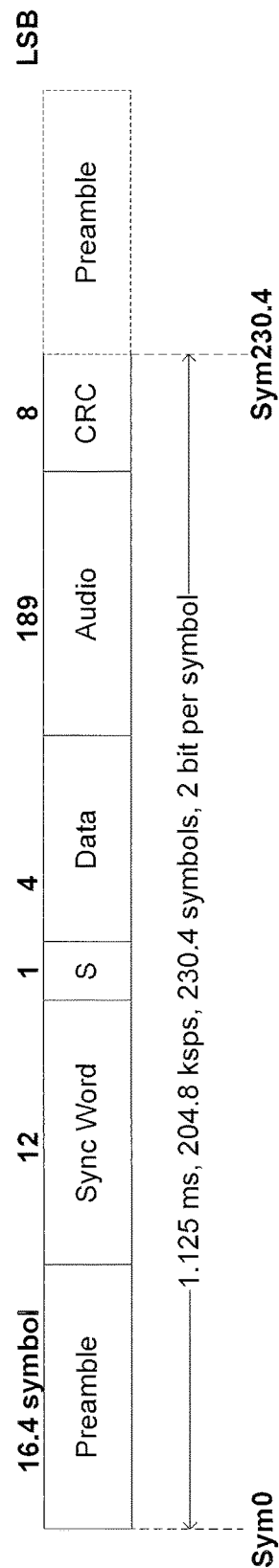
FIG. 3 is a diagram illustrating an embodiment of a frame structure.

FIG. 1 is a block diagram illustrating an embodiment of a transmitter.

The transmitter 100 comprises an analog-to-digital converter (ADC) 110, an audio signal compressor 120, a framer 130, a scrambler 140, a modulator 150 and a transmitting unit 160.

The analog-to-digital converter (ADC) 110 is configured to translate an analog audio signal into a digital Pulse-code modulation (PCM) format audio signal. In an embodiment, a sample rate of the digital PCM format audio signal varies from 28 kHz to 48 kHz. An Effective Number Of Bits (ENOB) of the digital PCM format audio signal is greater than 16 bits.

The audio signal compressor 120 may be implemented by an audio encoder, and is configured to compress the PCM format audio signal into a coded bit stream with a modified Adaptive differential Pulse-code Modulation (ADPCM) algorithm. In an embodiment, the coded bit stream has a bit rate of 336 kilobits per second (kbps).

The framer 130 is configured to packet the coded bit stream into a 1.125 ms frame by adding preamble, signaling (S), data field (Data), and Cyclic Redundancy Check (CRC) field to the coded bit stream. The framer 130 may packet the coded bit stream with scrambling and whitening procedure. The scrambling procedure will be discussed in more details with respect to the scrambler 140.

The scrambler 140 is configured to scramble the packet including audio data or also called the coded bit stream with an ID number. In another embodiment, the scrambler 140 is further configured to align a packet including the audio data, the data field and the signaling field with a plurality of copies of the ID number by performing XOR operation on the packet and the plurality of copies of the ID numbers in a bit-by-bit manner. The ID number may be a random number, so that the repetition of a plurality of ID numbers render the sequence random.

Figure 4:
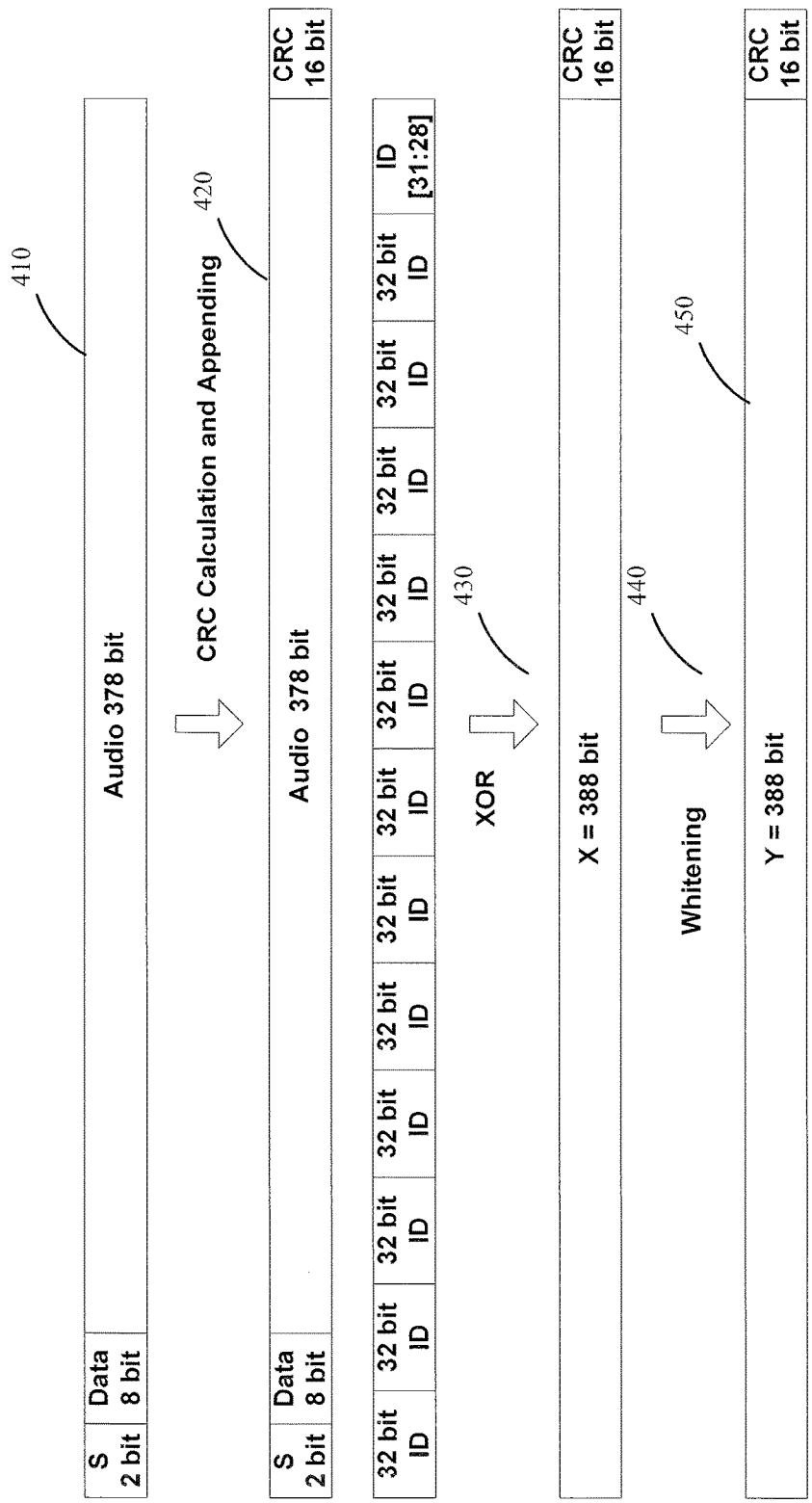
FIG. 4 is a diagram illustrating an embodiment of frame processing.

Now referring to FIG. 4, FIG. 4 is a diagram illustrating an embodiment of frame processing. In block 410, CRC is calculated based on a packet including the 378-bit (or 189-symbol) coded bit stream, the 2-bit (or 1 symbol) S field and the 8-bit (or 4-symbol) Data field. The coded bit stream is represented as audio in FIG. 4. Note the preamble and the sync word are not calculated for CRC, as they are used for physical layer transmission, and do not carry data payload. Further different transmitters share a same preamble and sync word. Then in block 420, after the CRC is calculated, the CRC is appended to the least significant bit (LSB) of the coded bit stream. Then, in block 430, a packet including the audio data, the data field and the signaling field is aligned with a plurality of copies of the ID number by performing XOR operation on the packet and the plurality of copies of the ID numbers in a bit-by-bit manner. Suppose the ID number has a length of 32 bits. In order for the ID number to be aligned with the packet, a complete copy of an ID number needs to be replicated for 12 times, while the highest 4 bits of the ID number, that is, the 31st bit to 28th bit of the ID number are appended to the end of the 12 copies of ID number. Therefore the 12 copies and the highest 4 bits of the ID number amounts 388 bits, which equals the length of the packet of 388 bits including 378-bit coded bit stream, 2-bit signaling field and 8-bit data field. Those having ordinary skill in the art should understand that the length of ID number may vary, therefore the number of copy of ID number may change accordingly to satisfy that the product of the length and number still equals the length of the packet including the audio data. Then in block 440, the result of XOR, which is represented as X including 388 bits, is whitened so as to randomize the data to mitigate or avoid crosstalk. Whitening procedure makes the frequency spectrum of the signal more uniform, which may easily meet Federal Communications Commission security requirement. After whitening, the final result is represented as Y which also comprises 388 bits, in block 450. Note the CRC result calculated from block 410 remained unchanged during blocks 420 to 450.

The modulator 150 is configured to modulate the scrambled signal with a predetermined modulation scheme. For example, the modulator 150 may modulate the scrambled signal with a it π/4-DPSK or QPSK modulation scheme with 204.8 kHz symbol rate. The transmitting unit 160 is configured to transmit the modulated signal. The transmitting unit 160 may comprise a radio frequency (RF) transmitter.

FIG. 3 is a diagram illustrating an embodiment of a frame structure. As shown in FIG. 3, a packet comprises a preamble, a sync word, a data field, an audio signal payload, a CRC field. The system uses a frame structure with 1.125 ms slot duration. The symbol rate is 204.8 Kilo Symbols Per Second (ksps), each symbol has 2 bits, which may be transmitted by π/4 (or a/4) DPSK modulation.

In an embodiment, the preamble has 16.4 symbols, which are all set to zeros. The receiver will use preamble for frequency offset estimation, antenna selection and automatic gain control. Alternatively, the preamble field has a length of at least 8-symbol.

The Sync word has a length of 12 symbols. In an embodiment, the Sync word may have the value of [3 1 1 3 3 1 1 1 3 3 1 3]. Alternatively, the Sync word may have the value of [1 1 3 1 1 3 3 3 1 1 3 1]. It will be used by the receiver to synchronize with the transmitter. Note the length of the Sync word discussed above is only for illustration. Alternatively, the synchronization word has a length of at least 8-symbol.

The S-field is used for proprietary indication, such as even slot and odd slot. The S-field may have a length of 1 symbol or 2 bits. For example, S=2'b00 will indicate the even slot, while the S=2'b11 for odd slot. 2'b00 mean 00 in Base 2, or 0 in decimal representation. 2'b11 means 11 in base 2, or 3 in decimal representation.

The Data-field has 4 symbols or 1 Byte, which is used to transmit data information such as battery voltage. This field can be written by MCU slot by slot. The Data-field may have a length of 4 symbol or 8 bits.

The Audio-field has 189 symbols, which is used to transmit compressed audio information, or coded bit stream. Note the Audio-field includes the payload. In an embodiment, a controller 170 is configured to send compressed digital PCM format audio signal, that is ADPCM signal, at a speed of at least 189 symbols per frame.

To allow multi-user co-existence, each pair of transmit and receive system will have the same unique ID code. The ID code can be 32 bits, which will be used to scramble the S-field, D-field and Audio-field.

The error check code CRC-field is applied to S-field, D-field and Audio-field before which are scrambled with the ID code.

Finally, the scrambled sequence including CRC-field will be whiten and modulated with π/4 DPSK modulation for RF transmission.

FIG. 2 is a block diagram illustrating an embodiment of a receiver. The receiver 200 comprises a receiving unit 210, a demodulator 220, a de-scrambler 230, a de-framer 240, an audio signal decompressor 250 and a digital-to-analog converter (DAC) 260.

The receiving unit 210 receives a signal. The demodulator 220 generates a demodulated signal by demodulating the signal with a predetermined demodulation scheme. The de-scrambler 230 de-scrambles the demodulated signal with an ID number. Alternatively, the de-scrambler 230 further aligns a packet including the coded bit stream, the data field and the signaling field with a plurality of copies of the ID number by performing XOR operation on the packet and the plurality of copies of the ID numbers in a bit-by-bit manner. The de-framer 240 de-packetizes the de-scrambled signal into coded bit stream by removing a preamble, a signaling field, a data field, and a cyclic redundancy check field from the de-scrambled signal. The audio signal decompressor 250 decompresses the coded bit stream into a PCM format audio signal using a modified Adaptive differential Pulse-code Modulation (ADPCM) algorithm. The digital-to-analog converter (DAC) 260 translates the PCM format audio signal into analog audio signal.

Alternatively, the preamble has a length of at least 8-symbol, and the preamble indicates to perform frequency estimation for the signal.

Alternatively, the signaling field has a length of 1-symbol, and the signaling field indicates an even or odd slot.

Alternatively, the data field has a length of 4-symbol, and the data field indicates data information of the coded bit stream.

Alternatively, the predetermined modulation scheme comprises π/4-DPSK or QPSK modulation scheme with 204.8 kHz symbol rate.

Alternatively, a sample rate of the digital PCM format audio signal varies from 28 kHz to 48 kHz, Effective Number Of Bits of the digital PCM format audio signal is greater than 16 bit, and the coded bit stream has a bit rate of 336 kbps.

Figure 5:
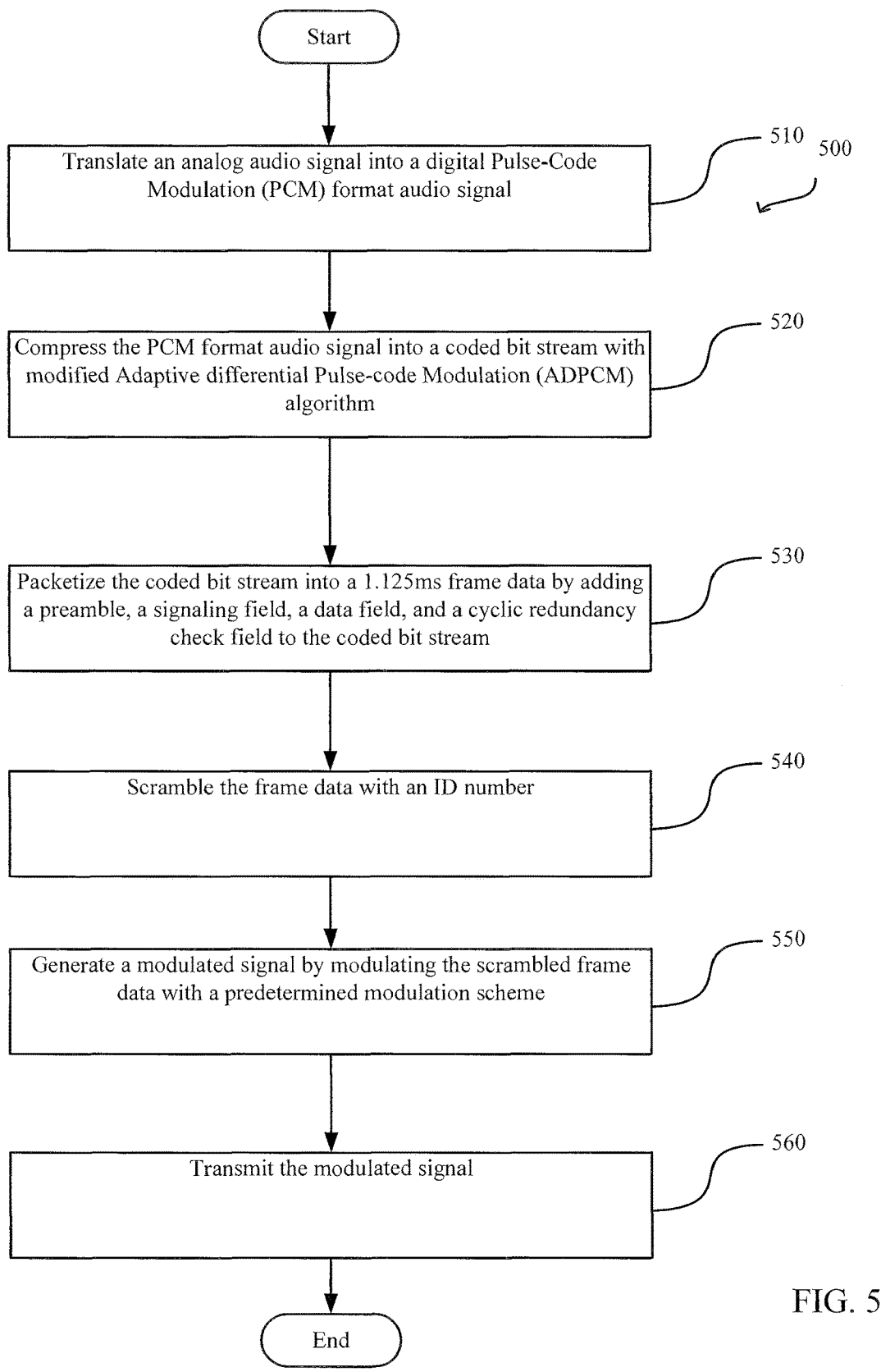
FIG. 5 is a flowchart illustrating an embodiment of a method of transmitting.

FIG. 5 is a flowchart illustrating an embodiment of a method of transmitting. A method in a transmitter, comprising translating, in block 510, an analog audio signal into a digital Pulse-Code Modulation (PCM) format audio signal; compressing, in block 520, the PCM format audio signal into a coded bit stream with a modified Adaptive differential Pulse-code Modulation (ADPCM) algorithm, packetizing, in block 530, the coded bit stream into a 1.125 ms frame data by adding a preamble, a signaling field, a data field, and a cyclic redundancy check field to the coded bit stream;

scrambling, in block 540, the frame data with an ID number; generating, in block 550, a modulated signal by modulating the scrambled frame data with a predetermined modulation scheme; and transmitting, in block 560, the modulated signal.

In an embodiment the transmitter 100 may be a Karaoke microphone, and the receiver 200 may be a power amplifier that receives a signal from the Karaoke microphone and amplifies the signal.

In at least one embodiment, as the frame structure eliminates address field, and uses ID number to identify different transmitter, the embodiment reduces on-the-air (OTA) overhead. Further the introduction of the XOR operation with ID number only requires a small computation. However, it reduces latency tremendously, since it uses unique frame structure.

Figure 6:
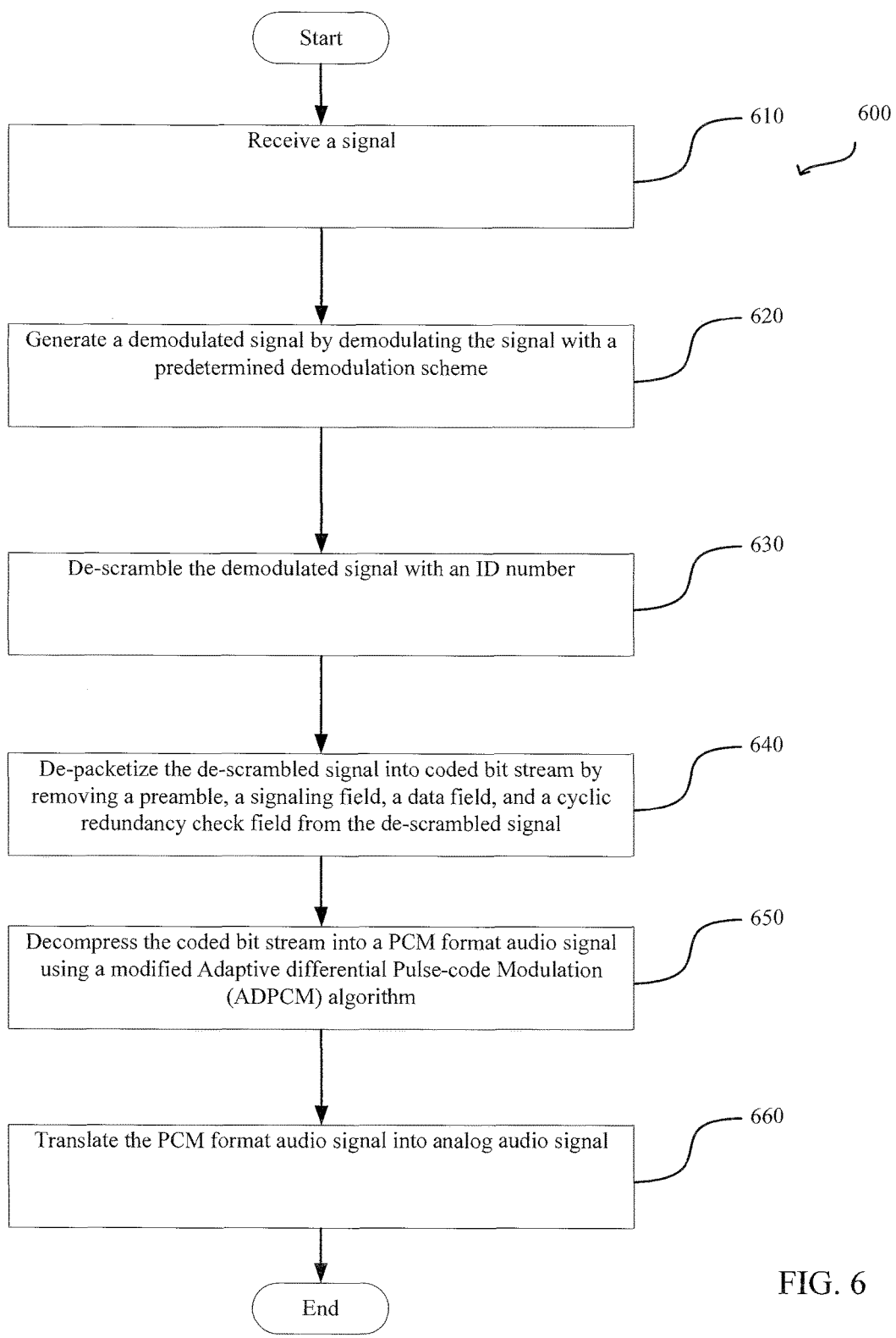
FIG. 6 is a flowchart illustrating an embodiment method of receiving.

FIG. 6 is a flowchart illustrating an embodiment of a method of receiving. The method 600 comprises receiving, in block 610, a signal; generating, in block 620, a demodulated signal by demodulating the signal with a predetermined demodulation scheme; de-scrambling, in block 630, the demodulated signal with an ID number; de-packetizing, in block 640, the de-scrambled signal into coded bit stream by removing a preamble, a signaling field, a data field, and a cyclic redundancy check field from the de-scrambled signal; decompressing, in block 650, the coded bit stream into a PCM format audio signal using a modified Adaptive differential Pulse-code Modulation (ADPCM) algorithm; translating, in block 660, the PCM format audio signal into analog audio signal.

Various aspects and examples of the invention will now be described. The following description provides specific details for a thorough understanding and enabling description of these examples. Those skilled in the art will understand, however, that the invention may be practiced without many of these details. Additionally, some well-known structures or functions may not be shown or described in detail, so as to avoid unnecessarily obscuring the relevant description.

In the above embodiments, we use audio data as an example. Those having ordinary skill in the art can understand that other data, such as image signal, and video signal can also be used with the above discussed embodiment, and the audio signal compressor or decompressor may be replaced with image or video signal compressor or decompressor respectively.

With at least one embodiment of the invention, the circuit may automatically follow the speed of the channel selecting mechanism for detecting channels. The circuit can search channels accurately without missing channels. The channel searching experience may be improved.

It should be appreciated by those skilled in the art that components from different embodiments may be combined to yield another technical solution. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A transmitter, comprising:
   an analog-to-digital converter circuit configured to translate an analog audio signal into a digital Pulse-Code Modulation (PCM) format audio signal;
   an audio signal compressor circuit configured to compress the PCM format audio signal into a coded bit stream with a modified Adaptive differential Pulse-code Modulation (ADPCM) algorithm;
   a framing circuit configured to packetize the coded bit stream into a 1.125 ms frame data by adding a preamble, a signaling field, a data field, and a cyclic redundancy check field to the coded bit stream;
   a scrambler circuit configured to scramble the frame data with an ID number;
   a modulator circuit configured to generate a modulated signal by modulating the scrambled frame data with a predetermined modulation scheme;
   a transmitter circuit configured to transmit the modulated signal; and
   a controller configured to send digital ADPCM format audio signal at least 189 symbols per frame.

2. The transmitter of claim 1, wherein the preamble has a length of at least 8-symbol, and the preamble indicates to perform frequency estimation for the signal.

3. The transmitter of claim 1 wherein the framing circuit is further configured to
   add an at least 8-symbol synchronization word to the coded bit stream, the synchronization word indicating to aid the receiver to be synchronized with the transmitter.

4. The transmitter of claim 1, wherein the signaling field has a length of 1-symbol, and the signaling field indicates an even or odd slot.

5. The transmitter of claim 1, wherein the data field has a length of 4-symbol, and the data field indicates data information of the coded bit stream.

6. The transmitter of claim 1, wherein the scrambler circuit further comprises an XOR gate configured to
   align a packet including the coded bit stream, the data field and the signaling field with a plurality of copies of the ID number by performing XOR operation on the packet and the plurality of copies of the ID numbers in a bit-by-bit manner.

7. The transmitter of claim 6, wherein the controller is further configured to generate a checked data by adding the cyclic redundancy check field to the aligned data.

8. The transmitter of claim 7, wherein the controller is further configured to whiten the checked data.

9. A transmitter, comprising:
   an analog-to-digital converter circuit configured to translate an analog audio signal into a digital Pulse-Code Modulation (PCM) format audio signal;
   an audio signal compressor circuit configured to compress the PCM format audio signal into a coded bit stream with a modified Adaptive differential Pulse-code Modulation (ADPCM) algorithm;
   a framing circuit configured to packetize the coded bit stream into a 1.125 ms frame data by adding a preamble, a signaling field, a data field, and a cyclic redundancy check field to the coded bit stream;
   a scrambler circuit configured to scramble the frame data with an ID number;
   a modulator circuit configured to generate a modulated signal by modulating the scrambled frame data with a predetermined modulation scheme;

a transmitter circuit configured to transmit the modulated signal;

wherein the predetermined modulation scheme comprises π/4-DPSK or QPSK modulation scheme with 204.8 kHz symbol rate.

10. The transmitter of claim 1, wherein a sample rate of the digital PCM format audio signal varies from 28 kHz to 48 kHz, Effective Number Of Bits of the digital PCM format audio signal is greater than 16 bit, and the coded bit stream has a bit rate of 336 kbps.

11. A receiver, comprising:
a receiver circuit configured to receive a signal;
a demodulator circuit configured to generate a demodulated signal by demodulating the signal with a predetermined demodulation scheme;
a de-scrambler circuit configured to de-scramble the demodulated signal with an ID number;
a de-framing circuit configured to de-packetize the de-scrambled signal into coded bit stream by removing a preamble, a signaling field, a data field, and a cyclic redundancy check field from the de-scrambled signal;
an audio signal decompressor circuit configured to decompress the coded bit stream into a PCM format audio signal using a modified Adaptive differential Pulse-code Modulation (ADPCM) algorithm;
a digital-to-analog converter circuit configured to translate the PCM format audio signal into analog audio signal;
wherein the predetermined modulation scheme comprises π/4-DPSK or QPSK modulation scheme with 204.8 kHz symbol rate.

12. The receiver of claim 11, wherein the preamble has a length of at least 8-symbol, and the preamble indicates to perform frequency estimation for the signal.

13. The receiver of claim 11, wherein the signaling field has a length of 1-symbol, and the signaling field indicates an even or odd slot.

14. The receiver of claim 11, wherein the data field has a length of 4-symbol, and the data field indicates data information of the coded bit stream.

15. The receiver of claim 11, wherein the de-scrambler circuit further comprises an XOR gate configured to
align a packet including the coded bit stream, the data field and the signaling field with a plurality of copies of the ID number by performing XOR operation on the packet and the plurality of copies of the ID numbers in a bit-by-bit manner.

16. A receiver, comprising:
a receiving circuit configured to receive a signal;
a demodulator circuit configured to generate a demodulated signal by demodulating the signal with a predetermined demodulation scheme;
a de-scrambler circuit configured to de-scramble the demodulated signal with an ID number;
a de-framing circuit configured to de-packetize the de-scrambled signal into coded bit stream by removing a preamble, a signaling field, a data field, and a cyclic redundancy check field from the de-scrambled signal;
an audio signal decompressor circuit configured to decompress the coded bit stream into a PCM format audio signal using a modified Adaptive differential Pulse-code Modulation (ADPCM) algorithm;
a digital-to-analog converter circuit configured to translate the PCM format audio signal into analog audio signal;
wherein a sample rate of the digital PCM format audio signal varies from 28 kHz to 48 kHz, Effective Number Of Bits of the digital PCM format audio signal is greater than 16 bit, and the coded bit stream has a bit rate of 336 kbps.

17. A method in a transmitter, comprising:
translating, by an analog-to-digital converter, an analog audio signal into a digital Pulse-Code Modulation (PCM) format audio signal;
compressing, by an audio signal compressor, the PCM format audio signal into a coded bit stream with a modified Adaptive differential Pulse-code Modulation (ADPCM) algorithm;
packetizing, by a framer, the coded bit stream into a 1.125 ms frame data by adding a preamble, a signaling field, a data field, and a cyclic redundancy check field to the coded bit stream;
scrambling, by a scrambler, the frame data with an ID number;
generating, by a modulator, a modulated signal by modulating the scrambled frame data with a predetermined modulation scheme; and
transmitting, by a transmitting unit, the modulated signal; and
sending, by a controller, digital ADPCM format audio signal at least 189 symbols per frame.

18. A method in a receiver, comprising:
receiving, by a receiving unit, a signal;
Generating, by a demodulator, a demodulated signal by demodulating the signal with a predetermined demodulation scheme;
de-scrambling, by a de-scrambler, the demodulated signal with an ID number;
de-packetizing, by a de-framer, the de-scrambled signal into coded bit stream by removing a preamble, a signaling field, a data field, and a cyclic redundancy check field from the de-scrambled signal;
decompressing, by an audio signal decompressor, the coded bit stream into a PCM format audio signal using a modified Adaptive differential Pulse-code Modulation (ADPCM) algorithm;
translating, by a digital-to-analog converter, the PCM format audio signal into analog audio signal;
wherein the predetermined modulation scheme comprises π/4-DPSK or QPSK modulation scheme with 204.8 kHz symbol rate.

* * * * *